US006002400A

United States Patent [19]
Loring et al.

[11] Patent Number: 6,002,400
[45] Date of Patent: *Dec. 14, 1999

[54] METHOD AND APPARATUS FOR HANDLES TO COMPONENTS IN GRAPHICAL WINDOWS USER INTERFACE

[75] Inventors: Keith Loring, Coral Springs, Fla.; Alan Happ, Raleigh, N.C.; Peter Eastwood, Salem, Utah

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/974,590

[22] Filed: Nov. 19, 1997

[51] Int. Cl.$^6$ .................................................. G06F 3/14
[52] U.S. Cl. .................................... 345/348; 345/349
[58] Field of Search ...................... 345/340, 333, 345/334, 348, 346, 977, 354, 349; 395/762; 707/501, 513

[56] References Cited

U.S. PATENT DOCUMENTS

| | | | |
|---|---|---|---|
| 5,021,976 | 6/1991 | Wexelblat e al. | 364/521 |
| 5,103,498 | 4/1992 | Lanier et al. | 395/68 |
| 5,140,678 | 8/1992 | Torres | 395/159 |
| 5,293,479 | 3/1994 | Quintero et al. | 395/161 |
| 5,430,836 | 7/1995 | Wolf et al. | 395/155 |
| 5,491,796 | 2/1996 | Wanderer et al. | 395/200.09 |
| 5,504,921 | 4/1996 | Dev et al. | 395/800 |
| 5,515,492 | 5/1996 | Li et al. | 395/155 |
| 5,515,496 | 5/1996 | Kaehler et al. | 395/159 |
| 5,721,850 | 2/1998 | Farry et al. | 395/346 |
| 5,760,773 | 6/1998 | Berman et al. | 345/347 |

OTHER PUBLICATIONS

After Dark for Windows Users Manual, Berkeley Systems, Inc., p. 8, 1991.

Jacquelin Gavron and Joseph Moran, How To Use Microsoft Windows NT 4 Workstation, Ziiff Davis Press. pp. 10–14, 136, 137, 1996.

IBM® Technical Disclosure Bulletin, vol. 38, No. 03, Mar., 1995, pp. 321–324; OS/2 Display Driver Installation Tool.

IBM® Technical Disclosure Bulletin, vol. 38, No. 07, Jul., 1995, pp. 399–300; Programming Language Independent Interface for Reusable Programmed Components.

IBM® Technical Disclosure Bulletin, vol. 39, No. 01, Jan., 1996, pp. 175–176; Multimedia User Interface Presentations in Multiple Environments.

(Abstract) (IBM Research Disclosure n342 10–92) Link Control User Interface; Authors: R.E. Berry, S.S. Fleming, J.M. Hary, C.A. Schaefer.

(Abstract) (IBM Research Disclosure RD 342001 A, Oct. 10, 1992)) Navigation ling control for user interface.

(Abstract) (IBM Research Disclosure RD 342005A, Oct. 10, 1992) Link control user interface for data processor.

Primary Examiner—Mark K. Zimmerman
Assistant Examiner—David E. Brown
Attorney, Agent, or Firm—Quarles & Brady LLP

[57] ABSTRACT

A method and apparatus for use with a computer having a graphical user interface, including a desktop, displayed on a computer screen. The system is designed for controlling the execution of a computer application program, and the relative position of a window associated with said application along a z-axis defined as extending perpendicular to the surface of the computer screen. The invention includes a new graphical user interface element in the form of a handle positioned along a peripheral edge of a desktop. The handle is configured so that it is always visible on the desktop, and the position of the handle is user defined or programmable according to a convention. A link is provided between the handle and an associated application so that when handle is activated by means of a pointing device, a window associated with the application will be displayed as a foreground window on the desktop. The system permits the application to be efficiently and quickly accessed by activation of the handle.

16 Claims, 6 Drawing Sheets

6,002,400

METHOD AND APPARATUS FOR HANDLES TO COMPONENTS IN GRAPHICAL WINDOWS USER INTERFACE

CROSS REFERENCE TO RELATED APPLICATIONS (Not applicable)

STATEMENT REGARDING FEDERALLY SPONSORED RESEARCH OR DEVELOPMENT (Not applicable)

BACKGROUND OF THE INVENTION

1. Technical Field

This invention relates to the field of computer user interface systems and more particularly to a system for providing rapid access to applications, directories and the like.

2. Description of the Related Art

Graphical user interfaces for computers have become widely used and accepted in recent years, particularly those systems which permit a single display device to present information in two or more discrete areas on a single screen. These discrete areas, often referred to as "windows" can be used to present information to a user in the form of text, drawings etc. For convenience, the information presented in a particular window shall herein be referred to as a "work object", since it is generally displayed to a user so that a particular action can be performed with respect thereto, such as reading, entering data, or manipulating the content of such window. For the purpose of implementing a graphical user interface, it has become common to provide means by which a user can point to objects or icons on screen by moving a displayed pointer cursor so that it is positioned over a particular graphical user interface element, and causing the computer system to respond in some manner associated with that particular user interface element. The icons or user interface elements represent applications, or other program files and are located on a display area commonly called the "desktop". Movement of the cursor can be accomplished by means of physical manipulation of a pointer device, such as a mouse, joystick or keyboards direction control keys. Pointer control signals can be provided by, for example, clicking on a mouse signaling button, striking a key, etc. Various methods and systems are available for implementing such graphical user interface systems as is well known to computer programmers in this field. However, one problem with such systems is that the presence of applications programs displayed on the display screen may obscure or cover a portion of the desktop where icons are located. Since conventional icons tend to be relatively large, they cannot remain in the foreground of the desktop or they would interfere with the use and operation of the application then running.

In the past, the number of interactive windows which could practically be displayed to a user on a display device was severely limited by considerations such as computer processing speed, available memory, and operating system architecture. In recent years, however, computers and their operating systems have become considerably more advanced, with the result that it is now possible to have many individual windows which may appear on the screen area. As a result, the available area for displaying windows on a screen will often be at a premium and must be carefully managed. Further, although screen resolution is continually improving, there are practical usability limitations which must be considered when reducing the physical size of work objects relative to the overall display screen. Thus, it has been a matter of continuing concern to develop new methods for obtaining the maximum benefit from the available screen area.

It is conventional to include a "toolbar" or some equivalent thereof to help keep track of active applications and files. The toolbar is typically provided in the form of a discrete window which facilitates access to commonly used applications and other objects. For example, the OS/2 operating system provides what is referred to as the "Launchpad", and the Windows95 operating system provides a "Taskbar". In the case of the Windows95, this toolbar includes a "Start" button which allows access to programs and an adjacent icon display area which displays the icon for any programs then running. One problem with toolbars such as the one implemented in Windows95 is that the icons on the toolbar do not have specifically assigned locations. Instead, the icon locations are typically arranged in the order in which they were launched. This can be a serious problem when a number of applications are running at once, as it causes difficulty in locating the various icons in the toolbar icon display area. Another problem with conventional toolbars concerns the amount of area or "screen real estate" that the toolbar absorbs on the desktop. This problem frequently occurs when a user arranges his toolbar settings so that the toolbar is always visible on an area of the screen, regardless of what other programs may be running. This arrangement is advantageous as it permits most convenient access to the toolbar; however, it also represents a waste of valuable screen real estate when the toolbar is not being actively used. Ideally, it would be desirable to provide a system which provides the ease of access offered by conventional toolbars but preserves a maximum amount of screen real estate for display of work objects on the desktop and windows relating to application programs in use by a user.

Programs such as Windows 95 permit a user to also cause a program to be executed by making use of the so called "Start" button provided on the toolbar. By making use of the "Start" button feature, a user can cause a series of directories and program menus to be displayed. The user may indicate a selected program from among those displayed by activating the buttons associated with a pointing device, such as a mouse. Significantly, however, the "Start" button feature also tends to be somewhat inconvenient to use, requiring a user to scroll through two or more sets of menus, searching for the particular program desired. Accordingly, it would also be desirable to provide an improved means for locating a program to be executed as compared to the "Start" menu system which is currently available.

The Windows95 Operating system also includes a feature called shortcuts which can place a duplicate icon on the desktop, for example, so that the "Start" button menu can be avoided. However, such shortcuts suffer from the same problems as conventional icons in that they require an excessive amount of screen area and are not always at the top of the Z-order on the display.

Finally, screen real estate can often be at a premium in current computer operating systems. The various icons, window, menu keys, and the like can increase the cognitive load on a user engaged in use of the computer. Accordingly, it would also be desirable to provide a method which permits efficient access to programs while simultaneously reducing screen clutter and results in a simplified screen display.

SUMMARY OF THE INVENTION

A method and apparatus for use with a computer having a graphical user interface, including a desktop, displayed on a computer screen. The invention provides means for controlling access to computer applications, files, directories and/or a window associated with an application. The invention includes a graphical user interface element in the form of a handle, which is preferably positioned along a peripheral edge of a desktop. Positioning the handle at the edge of the desktop eases tactile effort required to position a cursor on the handle by taking advantage of the fact that the desktop edge limits the range of movement of the cursor in a given direction. The handle is preferably configured so that it is always visible on the desktop or if not always on top, will ascend to the top of the z-order when a keystroke, hot spot or mouse button is activated. The position and visual features of the handle can be user defined or can be dynamically assigned characteristics such as color, position, pattern, or animation in accordance with a user defined convention. According to a preferred embodiment, handles can spin, animate or flash in order to attract a user's attention.

The handles may be implemented as fixed, "edge length" sized handles, which extend along an entire length of one edge of the desktop, preferably having a thickness which is trivially thin, extending only about 3 to 20 pixels from the edge of the useable desktop area. The handles may also be dynamically sized to fill a given edge of the screen so, for example, if a user created four handles on the left edge of a computer screen, they would each occupy an equal ¼th length of that edge. Moving one of the four handles to another edge would re-size (but not re-order) the remaining three handles so as to occupy equal ⅓ of the left edge each.

An address path is provided between the handle and an associated application so that when the handle is activated by means of a pointing device, a window associated with the application will be displayed as a foreground window on the desktop. The system permits the application to be efficiently and quickly accessed by activation of the handle, without the need for a "Start" menu, "Toolbar" or similar such features.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE INVENTION

Figure 1:
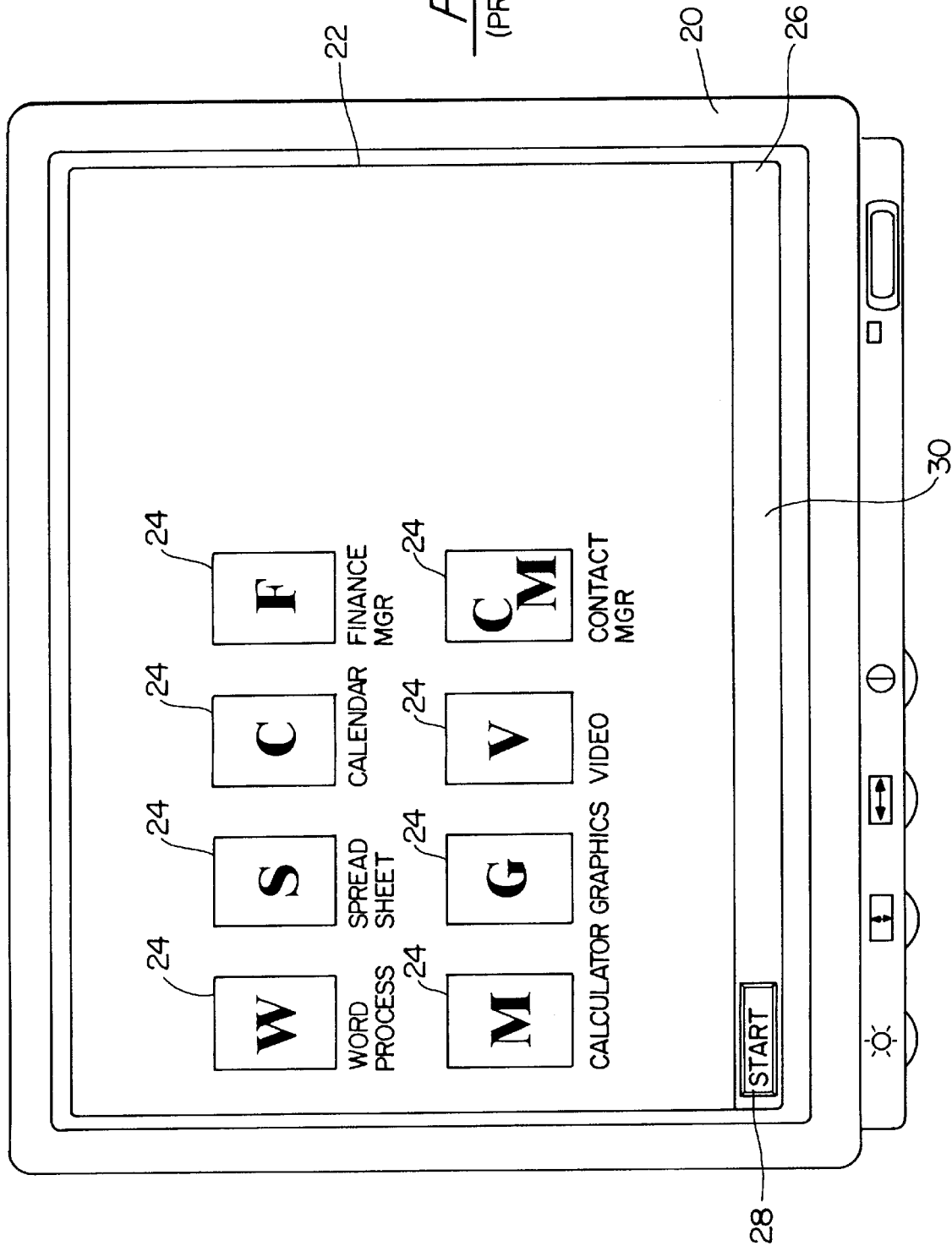
FIG. 1 is a desktop for a conventional graphical user interface of the prior art displayed on a computer monitor.
Figure 2:
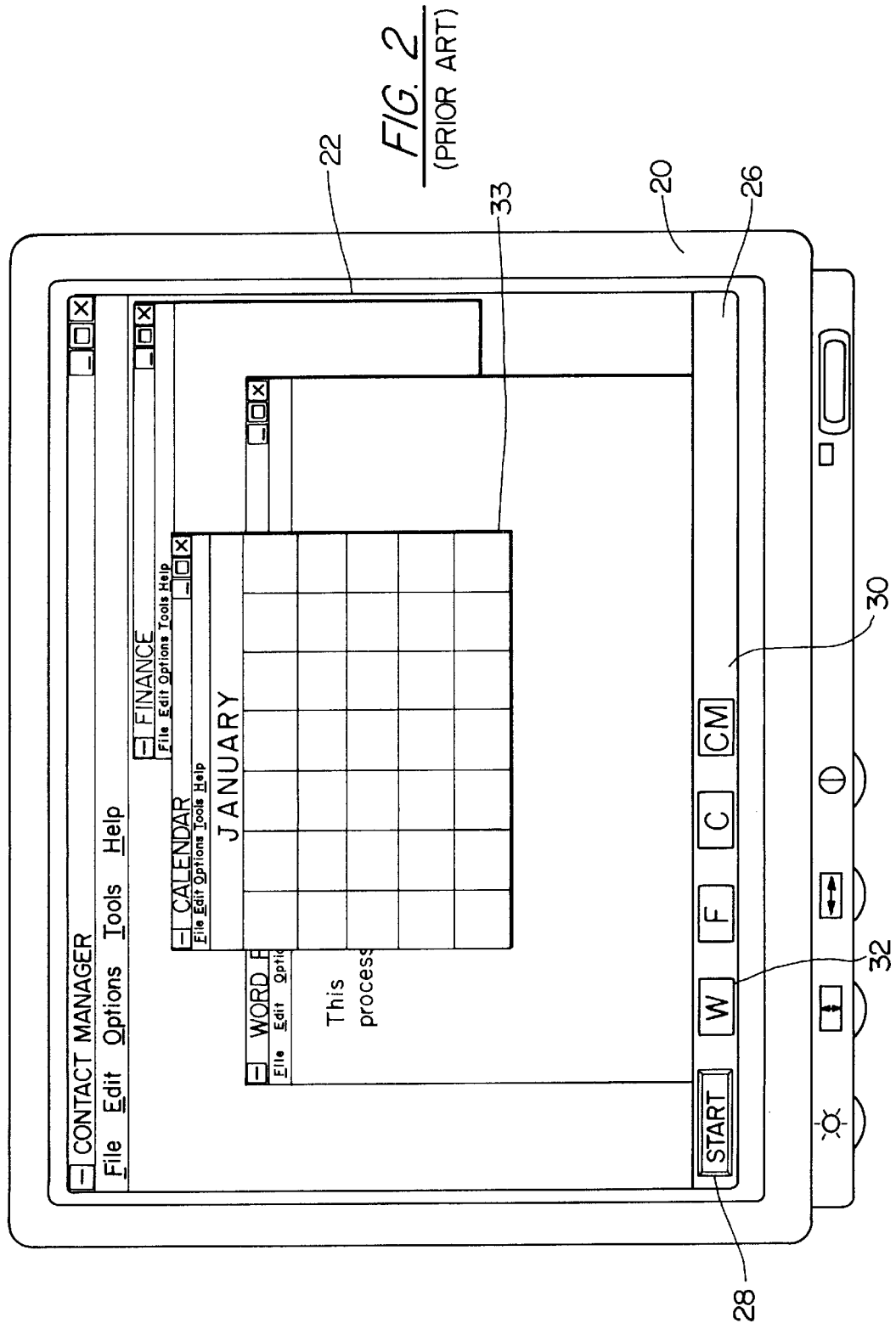
FIG. 2 is a desktop for the conventional graphical user interface shown in FIG. 1, with several application programs executing.

FIG. 1 illustrates a conventional graphical user interface displayed on a computer monitor 20. The graphical user interface includes various icons 24 displayed on a "desktop" 22 and a toolbar 26 at the bottom of the screen. The desktop is the portion of a computer display screen on which a user interface is displayed and typically makes use of a desktop metaphor with icons identifying specific application programs. The desktop concept is well know among computer programmers skilled in this field. The toolbar includes a "Start" button 28 as is used, for example, in the Windows95 operating system and includes an active application icon display area 30 adjacent thereto. In conventional systems such as the one shown, users can select various application programs stored in the memory of a computer by activation of the "Start" button or by using a pointing device such as a mouse to click on an icon. As shown in FIG. 2, when an application is executing, a toolbar icon 32 representing that application will appear in the active application icon display area 30, usually in the order in which the application was launched. If additional applications are selected from the "Start" button 28, the toolbar icons for such applications will also be displayed. In FIG. 2, there are four application programs running, with application window 33 currently occupying the position of foreground window. Note that icons 24 are obscured in FIG. 2 by the presence of the applications displayed in the windows.

Although some operating systems allow users the option of permitting windows for application programs to be displayed on top of the toolbar 26, many users prefer to arrange the settings on their systems so that the toolbar is always on top, where it is most easily accessible. The toolbar 26 is shown in this position in FIG. 2. As shown in FIG. 2, however, the toolbar 26 actually consumes a relatively large amount of screen area, which is a serious drawback in the case of smaller screens where there are multiple applications running. In FIG. 2, only four application programs are shown to be executing; however, the problems associated with the toolbar consuming valuable screen area is compounded when additional applications are operating and the size of the toolbar 26 must be enlarged to display all of the various toolbar icons 32.

In a typical operating system environment such as the Windows family of operating systems available from Microsoft, the available area for displaying windows on a screen will often be insufficient due to the number of application windows which are open and limited screen size. As a result, various systems have been implemented to permit windows to be stacked, one on top of the other, or to be moved and altered in size as shown in FIG. 2, so that a user has maximum flexibility in making best use of the available screen area. A window which is displayed on top of all others, as is window 33 in FIG. 2, is typically referred to as the foreground window. The foreground or topmost window may be thought of as the window closest to a user along the direction of a z-axis extending in a direction perpendicularly away from the screen surface of the monitor 20. When a user wishes to make use of an application which is not currently displayed as the foreground window, the application can be moved to the foreground by using a pointing device, such as a mouse, to activate the application's toolbar icon 32 which appears in the active application icon display area 30 of the toolbar 26. In conventional systems however, the relative position of each of the icons in the active application icon display area 30 will vary with each use, depending, for example, upon the order in which the applications were each started. When a number of applications are executing concurrently, the arrangement of the toolbar icons can be relatively tedious to a user when searching for a specific application which is to be moved to the foreground. The reason is that the icons are generally arranged on the toolbar in a temporal organization, depending on the order in which they began executing. For the user, the effect is essentially a random pattern, as the temporal organization will be of little or no significance to the user in most cases. Thus, use of the toolbar requires visual scanning and multiple cognitive associations to locate a desired icon.

Figure 3:
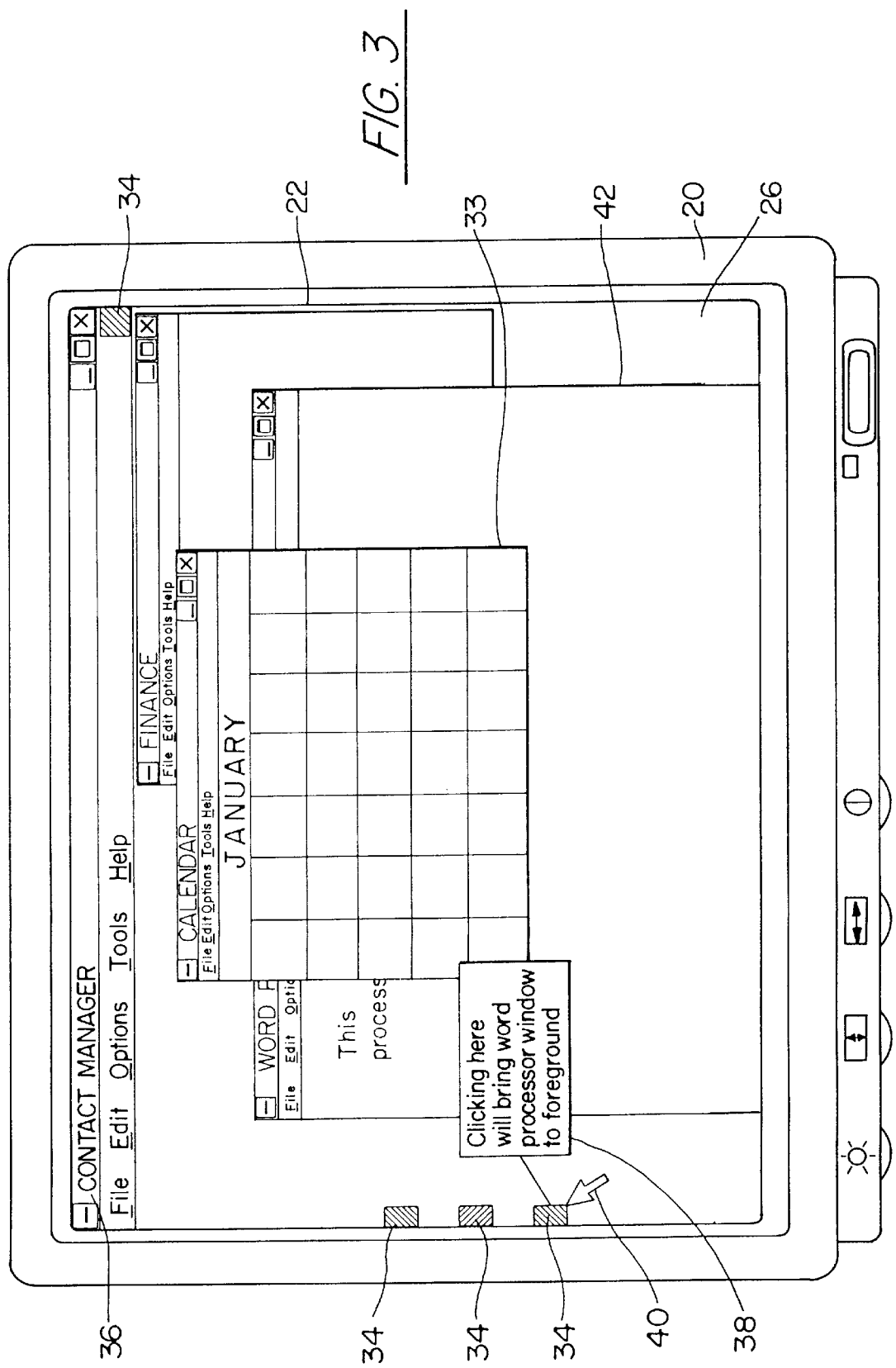
FIG. 3 shows the handles according to the present invention implemented in the desktop of FIG. 2.

In FIG. 3, several handles 34 are shown aligned along the edge of the desktop. Like other objects, the handles 34 according to the invention preferably have properties and settings associated with them so that a user may choose the handles' precise size, color, pattern, default location, etc. In order to minimize intrusion into the usable display area of the desktop, the handles are preferably of a relatively small size, between about 3 pixels to 20 pixels in length and width. However, larger handles can also be used with the invention. In an alternative embodiment shown in FIG. 4, a handle can be defined so that its length extends along the entire edge of the desktop, with a narrow thickness on the order of 3 to 5 pixels wide.

As shown in FIG. 3, the handles 34 are designed to provide quick, efficient access to commonly used system components such as applications or other work objects such as files or palettes. Significantly, the handles can also be used to distinguish between an application and a pop-up child window, thereby allowing the user to use handles arbitrarily between applications and parts of applications. Thus, when a user activates the handle associated with an application, the application is launched; whereas a handle associated with a specific pop-up child window within an application preferably causes that window to rise to the top of the Z-order.

As shown in FIG. 3, handles 34 can be designed as small colored tiles which are preferably positioned on the edge of the screen display area comprising the desktop. In one embodiment, the position of the handle is user defined so that it will not vary unless reset by a user. Handles can spin, animate or flash in order to attract a user's attention. In an alternative embodiment shown in FIG. 3, the handles have pop-up help 38 that describes what the handle 34 is linked to (or what it does) when, for example, a mouse cursor 40 is positioned over the particular handle.

Figure 4:
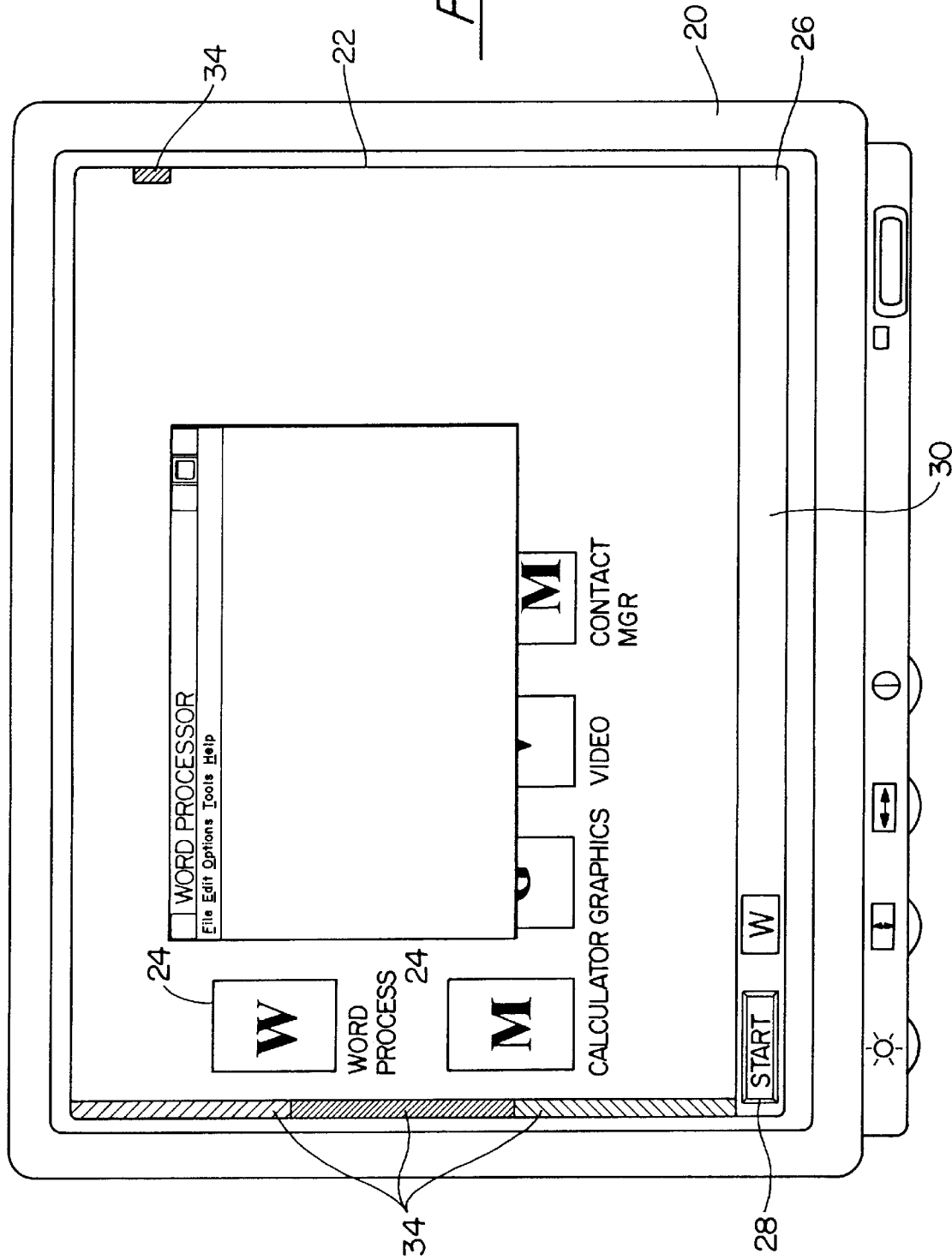
FIG. 4 shows an alternative implementation of the handles in FIG. 3.

In an alternative embodiment shown in FIG. 4, the handles can be implemented as fixed, "edge length" sized handles, which extend along an entire length of one edge of a screen. When configured in this way, a user can more easily position a cursor over the handle by simply moving the cursor anywhere along a particular edge. If the handle is positioned along an edge of the screen, it can advantageously be implemented so that its thickness is trivially thin, extending only between about 3 to 5 pixels from the edge of the useable display area comprising the desktop. Positioning the handle at the screen edge eases tactile effort required to position a cursor on the handle by taking advantage of the fact that the screen edge limits the range of movement of the cursor in a given direction.

In a further alternative embodiment, the handles may be dynamically sized to fill a given edge of the screen. For example, if a user created four handles on the left edge of a computer screen, they would each occupy an equal ¼th length of that edge. Moving one of the four handles to another edge would re-size (but not re-order) the remaining three handles so as to occupy equal ⅓ of the left edge each. As with other handles implemented along the screen edge, the thickness of the handle can be designed to be trivially thin so as to take advantage of the screen edge limitation on cursor movement. The handle is preferably configured so that it is always visible on the top of the z-order, or if not always on top, will ascend to the top of the z-order when a keystroke, hotspot or mouse button is activated.

Figure 5:
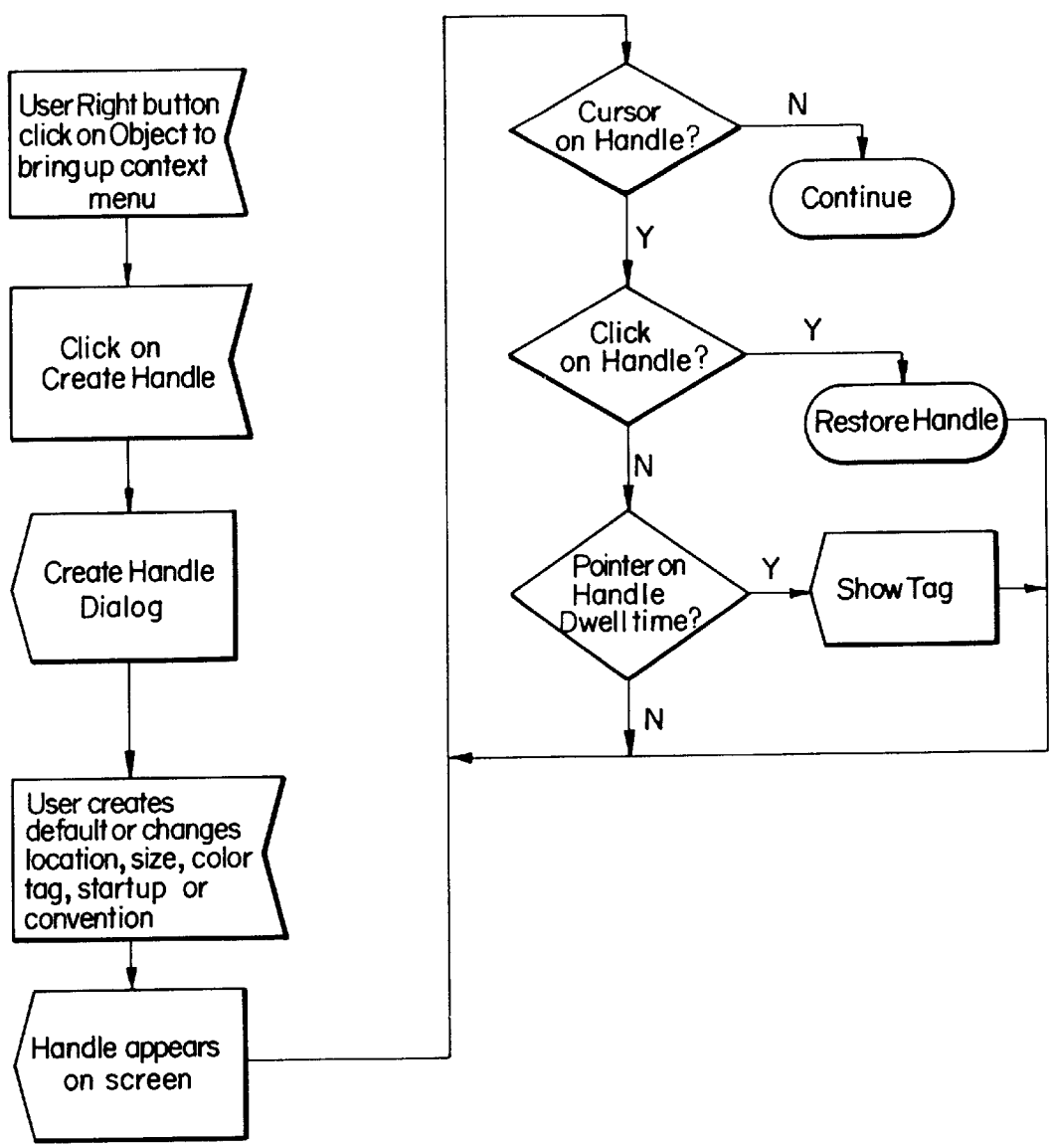
FIG. 5 is a flow chart illustrating the basic operation of the handles according to the invention.

According to one embodiment of the invention, the handles 34 are designed so that each one functions as a permanent link to an application, pop-up window, or other file in a manner similar to that of a conventional icon 32 or 24. Rather than being limited to such a static implementation, however, the handles can also be dynamic so as to be automatically created and deleted as various applications are launched and exited, respectively. The creation and operation of handles can be implemented directly as part of the operating system or as a single, always running application which would display and act on all handles using standard windows messaging for mouse activity. FIG. 5 is a flow chart which illustrates the basic means by which the handles may be implemented. Significantly, it should be noted that a handle may be created for any object or icon such as a folder, file or application.

In the case of dynamic handles, it is desirable to configure the handles application to automatically assign a unique color, pattern, position or animation characteristic to new handles as they are created, so as not to interrupt the user or require user input concerning such matters. Conventions or rules are preferably defined by a user for assigning such characteristics to facilitate ease of use for such handles. Examples of such conventions or rules would include use of the left edge of the screen to display dynamic handles, use of a certain color, patterns, or arrangement to convey information regarding the hierarchy of the windows associated with a set of handles, or positioning along one edge of the screen according to frequency of use. In a preferred embodiment, the handles application can be configured to permit dynamic and static handles so, for example, a static handle can be assigned to a particular user application but when the application is launched, dynamic handles are subsequently created which are linked to each pop-up windows within the user application.

The link between handles and programs is implemented in the same manner as between conventional icons and programs. The conventional operating system graphical user interface is a program containing icons which are associated with a program or application by means of a reference to the program's main executable file such as ""c:\windows\notepad.exe" in the case of the standard Windows notepad program. Often, the icon is stored within the .exe or executable file. Similarly, a handles application would maintain a collection of handle records including size, color, pattern, position, animation (or some set of rules for defining same), as well as the file name of a program or data file. Further, just as conventional graphical user interface operating systems do, the handles application will call the well known exec() or spawn() functions available in the Windows family of operating systems and the OS/2 operating system. Each of these functions starts another program, or in the case of a data file, makes use of "associations" to determine what program to start for a given data file by checking the file extension. Other multi-tasking operating systems such as AIX/UNIX have corresponding function calls are used for this purpose. When a program is started, it determines if it will ignore the possibility that another instance of the same application is already running, or perhaps will raise the existing instance of the application to the top of the Z-order.

In a preferred embodiment, the handles 34 are configured so that they are always displayed on top of any windows or work objects on the desktop 22. Thus, the handles 34 are always visible, regardless of whether a particular applications window area is maximized so that it covers the entire remaining available desktop display area for the screen. In FIG. 3, the "Contact Manager" application program 36 is shown maximized so that it covers the entire desktop area, but the handles 34 remain visible.

Significantly, it should be noted that in FIG. 3, the space previously occupied by the toolbar can now be made available so that it can be more productively used for display of work objects contained within the various windows, such as window 42. This can be accomplished by altering the toolbar settings so that the toolbar no longer remains on top of the other application windows. This is a distinct advantage over prior art systems as it permits convenient access to applications while avoiding wasteful use of desktop area. Moreover, the ability to designate and consistently maintain the location of a handle 34 is an important feature, as research in this area has shown that location is a more powerful memory aid as compared to an icon's appearance or any text associated therewith. The invention keeps the powerful cue of location fully under a users control and therefore allows frequently used programs to be easily accessible at all times. The handles also minimizes use of valuable screen real estate while taking advantage of color, pattern, or animation cues to maintain ease of use. Finally, individual windows within an application can be readily accessed with the invention, with the user relying on conventions associated with the display of such handles.

Graphical user interfaces implemented by several available operating systems have the common goal of making commonly used icons easily available. These include operating systems such as OS/2 available from IBM, Windows 95 which is offered by Microsoft, Inc. and systems available from Hewlett Packard, which display icons on the desktop area. However, these systems all require valuable space on the desktop and, if the icons are always on top, tend to obscure a user's application. Moreover, in these systems (e.g. Windows 95), the powerful tool of location is not maintained under a user's control in the case of the toolbar. In a preferred embodiment of the present invention, the handles 34 as described herein may be configured so that they are displayed, regardless of whether the particular application associated with the handle is then executing. See FIG. 4. Thus, when other applications are executing and the windows for such applications are covering all or part of the desktop, a user may nevertheless be able to maintain fast and efficient access to applications via the handles 34. Once again, this result is achieved because the handles are always on top, and in user defined locations so that the powerful cue of location is not lost. Because the identification of the handles is primarily location based, with available pop-up help to identify the purpose of a particular handle, the relative size of the handle can be minimized. No text or visible icon design is required, and usable desktop area is maximized.

The method and apparatus according to the invention are designed for use on any type of computer system which incorporates a graphical user interface. However, it should be recognized that it may also be adapted for use with text-only interfaces. The system is preferably comprised of a central processing unit (CPU), including one or more memory devices and associated circuitry. The memory devices are typically comprised of an electronic random access memory and a bulk data storage medium, such as a magnetic disk drive. The system includes a pointing device, such as a mouse, operatively connected to said computer system through suitable interface circuitry, and at least one user interface display unit or computer screen, such as a video data terminal (VDT) operatively connected thereto. The CPU can be comprised of any suitable microprocessor or other electronic processing unit, as is well known to those skilled in the art. An example of such a CPU would include the Pentium brand microprocessor available from Intel Corporation or any similar unit such as a 486 or 386 type microprocessor.

The various hardware requirements for the computer system as described herein can generally be satisfied by any one of many commercially available high speed personal computers offered by manufacturers such as Compaq, Hewlett Packard, IBM Corp or Apple Computers. In a preferred embodiment as discussed herein, the invention may be used with the OS/2 operating system provided by IBM, the Windows95 operating system offered by Microsoft or any other operating system which currently makes use of a conventional toolbar similar to those used in the named operating systems. However, the system is not limited in this regard, and the invention may also be used with any other type of computer operating system incorporating a graphical user interface. The system as disclosed herein can be implemented by a programmer, using commercially available development tools for the operating systems described above. In a preferred embodiment, the subject invention can be implemented as a standard Windows application, i.e. a 32 bit, Object Oriented, C++, Windows 95 application developed using the Microsoft Visual C++ compiler and development tools.

Figure 6:
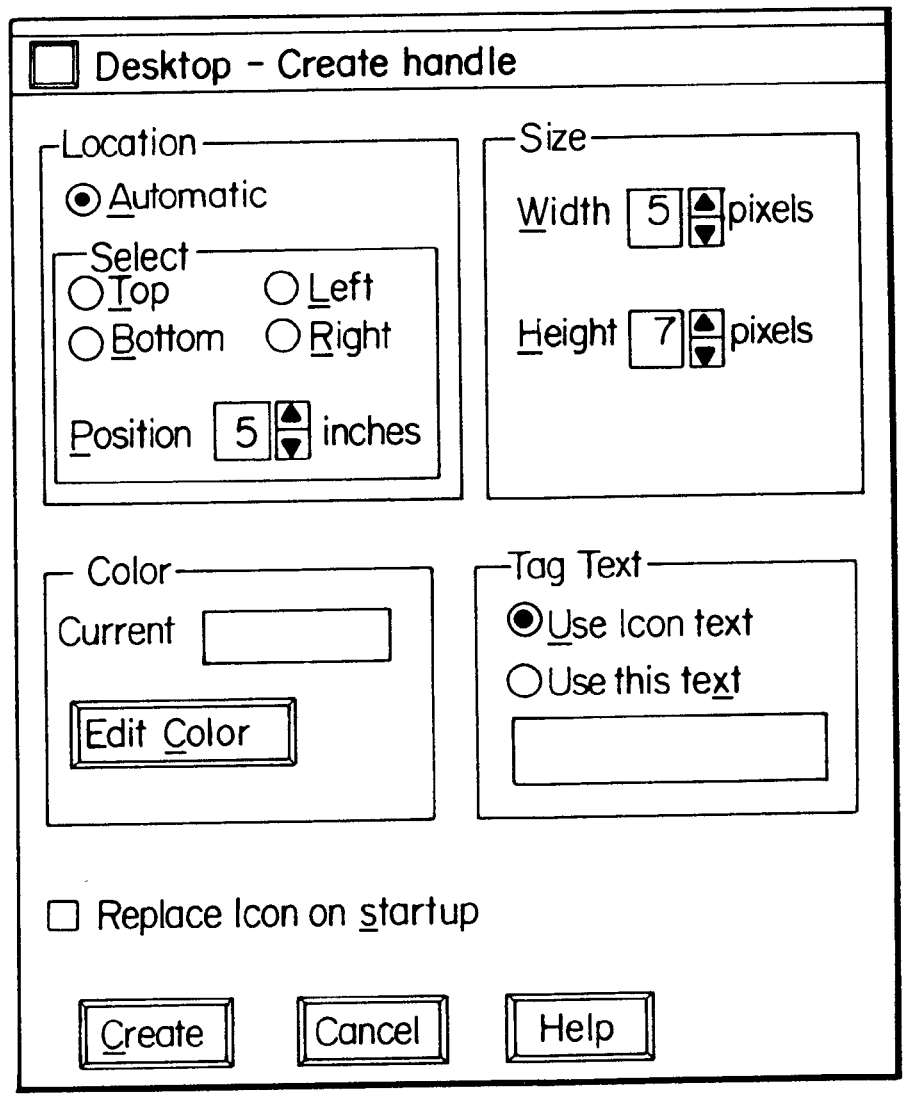
FIG. 6 is a dialog box for use with the handles according to the present invention.

FIG. 5 illustrates, in flow chart form, the basic operation of the handles according to the invention. A dialog window would support creating a new handle or changing settings that apply to all handles. A dialog box as shown in FIG. 6, which supports manipulating settings of specific handles would be activated, for example, by a right mouse button click on a specific handle. Appropriate calls to the target application from the handle application would include exec() or spawn(), for the Windows and OS/2 operating systems, or corresponding variants of these function calls, as are commonly available on other multitasking operating system (e.g. AIX/UNIX) as is well known to programmers in this field.

We claim:

1. A method for operating a computer having a user interface desktop controllable by a pointing device having a pointing device cursor, to control at least one of the execution of an application and the relative position along a z-axis of said desktop of a window associated with said application, said method comprising:

providing in a fixed position on said desktop a handle which is separate from any group of handles that can be resized and moved by a pointing device, said handle configured so that it is always displayed at a foremost position along said z-axis, the position of said handle along said edge of said desktop being user defined;

providing at least one edge portion of said handle coincident with an edge of said desktop delimiting a range of movement of said pointing device cursor;

linking said handle to said application so that when said handle is activated by means of a pointing device, said application will be caused to execute and said window will be displayed at a foremost position along said z-axis.

2. The method according to claim 1 wherein said handle has no visible identifying matter contained thereon and is identifiable to a user only by said fixed position on said desktop.

3. The method according to claim 1 wherein said handle is dynamically sized to fill said edge of the desktop.

4. The method according to claim 3 wherein said portion of said edge is inversely proportionate to the total number of handles displayed on said edge of said desktop.

5. The method according to claim 1 wherein the visual features of said handle may be selected by a user for ease in identifying said handle.

6. The method according to claim 1 wherein one or more of said handles are dynamically created when said application program is launched, and said handles are linked to specific windows of said application program.

7. The method according to claim 1 wherein said desktop edge is coincident with an edge of said handle and said handle has a thickness of between about 3 to 20 pixels extending from said desktop edge.

8. A program routine of instructions stored in a physical medium for use with a computer having a user interface desktop controllable by a pointing device having a pointing device cursor displayed on said desktop, said program routine for controlling at least one of the execution of an application, and the relative position along a z-axis of said desktop of a window associated with said application, said program routine comprising:

handle means for displaying on said desktop a handle which is separate from any group of handles that can be resized and moved by a pointing device, said handle configured so that it is always positioned at a foremost location along said z-axis, a fixed position of said handle along said edge of said desktop being user defined so that said position will not vary unless reset by a user;

means for providing at least one edge portion of said handle coincident with an edge of said desktop delimiting a range of movement of said pointing device cursor;

linking means for linking said handle to said application so that when said handle is activated by means of a pointing device, said window associated with said application will be displayed as a foreground window on said desktop.

9. The program routine of instructions according to claim 8 wherein said handle has no visible identifying matter contained thereon and is identifiable to a user only by said position on said desktop.

10. The program routine of instructions according to claim 8 wherein said handle means fills said edge of the desktop.

11. The program routine of instructions according to claim 10 wherein said handle size inversely proportionate to the total number of handles displayed on said edge of said desktop.

12. The program routine of instructions according to claim 8 wherein said handle means is programmable by a user to define the visual features of said handle.

13. The program routine of instruction according to claim 8 wherein said handle means is configured so that one or more of said handles are dynamically created when said application program is launched, and said handles are linked to specific windows of said application program.

14. The program routine of instructions according to claim 8 wherein said desktop edge is coincident with an edge of said handle and said handle means is configured so that said handle has a thickness of between about 3 to 20 pixels extending from said desktop edge.

15. A computer user interface desktop controllable by a pointing device having a pointing device cursor displayed on said desktop, for controlling at least one of the execution of an application and the relative position along a z-axis of said desktop of a window associated with said application, said user interface comprising:

handle means displayed on said desktop, said handle means separate from any group of handles that can be resized and moved by a pointing device and configured so as to be always positioned at a foremost location along said z-axis, a fixed position of said handle means along said edge of said desktop being user defined so that such position will not vary unless reset by a user;

means for providing at least one edge portion of said handle means coincident with an edge of said desktop delimiting a range of movement of said pointing device cursor;

linking means for linking said handle means to said application so that when said handle is activated by means of a pointing device, said window associated with said application will be displayed as a foreground window on said desktop.

16. The program routine of instructions according to claim 15 wherein said handle means has no visible identifying matter contained thereon and is identifiable to a user only by said position on said desktop.

\* \* \* \* \*